United States Patent [19]

Perrin et al.

[11] Patent Number: 4,637,747
[45] Date of Patent: Jan. 20, 1987

[54] DEVICE FOR MOUNTING A PROTECTIVE CAP ON A SUPPORT

[75] Inventors: Alain Perrin, Bobigny; Patrice Moinard, Montreuil, both of France

[73] Assignee: Societe Anonyme D.B.A., Paris, France

[21] Appl. No.: 643,600

[22] Filed: Aug. 23, 1984

[30] Foreign Application Priority Data

Sep. 19, 1983 [FR] France ................. 83 14860

[51] Int. Cl.[4] .............................. F16B 1/04
[52] U.S. Cl. ..................... 403/23; 403/355; 403/51; 277/212 FB; 188/322.16; 74/18.2
[58] Field of Search ............... 403/50, 51, 134, 23, 403/324, 316, 319, 341, 374, 355; 277/212 FB; 74/18.2, 18.1; 188/322.16, 322.17, 322.18

[56] References Cited

U.S. PATENT DOCUMENTS

| 2,019,757 | 11/1935 | Loweke | 74/18.2 X |
| 2,305,265 | 12/1942 | Tourneau | 403/50 X |
| 2,405,476 | 8/1946 | Weatherhead | 403/149 X |
| 2,793,501 | 5/1957 | Rike | 403/51 X |
| 2,950,499 | 8/1960 | Schlage | 74/18.2 X |

FOREIGN PATENT DOCUMENTS 1483088 4/1967 France .
1228044 4/1971 United Kingdom .

Primary Examiner—Cornelius J. Husar
Assistant Examiner—Joseph A. Fischett
Attorney, Agent, or Firm—Larry J. Palguta; Ken C. Decker

[57] ABSTRACT

Device for mounting a protective cap (18) on a support (12), the support (12) having a base surface (20) intended to be at least partially protected by the cap (18), and a first bearing surface (28, 38, 54), the device incorporating a first rigid component (22, 32, 44), joined to the periphery of the cap (18), and a locking component (26, 40) situated between the first rigid component and the first bearing surface, characterized in that the locking component (26, 40) is inserted by sliding laterally between the first component (22, 32, 44) and the first bearing surface (28, 38, 54) so as to fix the cap (18) in position bearing against the base surface (20) of the support.

6 Claims, 7 Drawing Figures

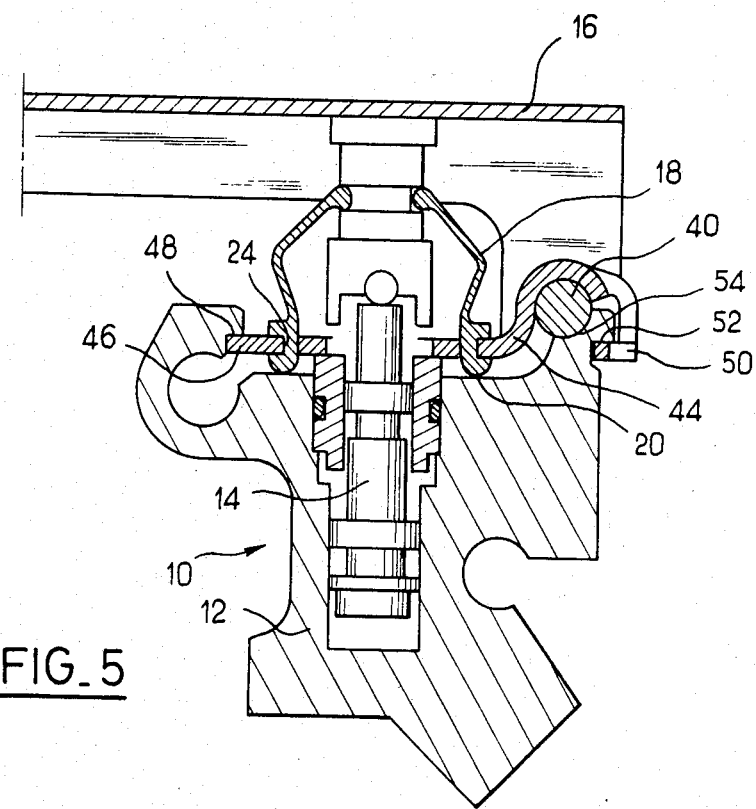
FIG_5
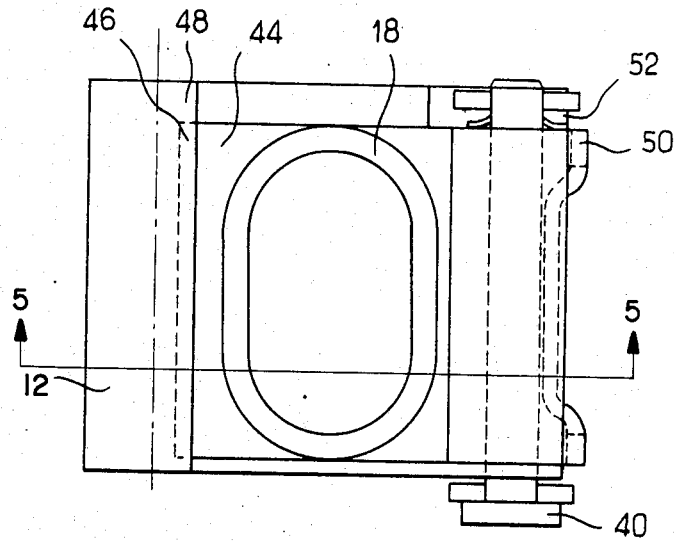
FIG_6

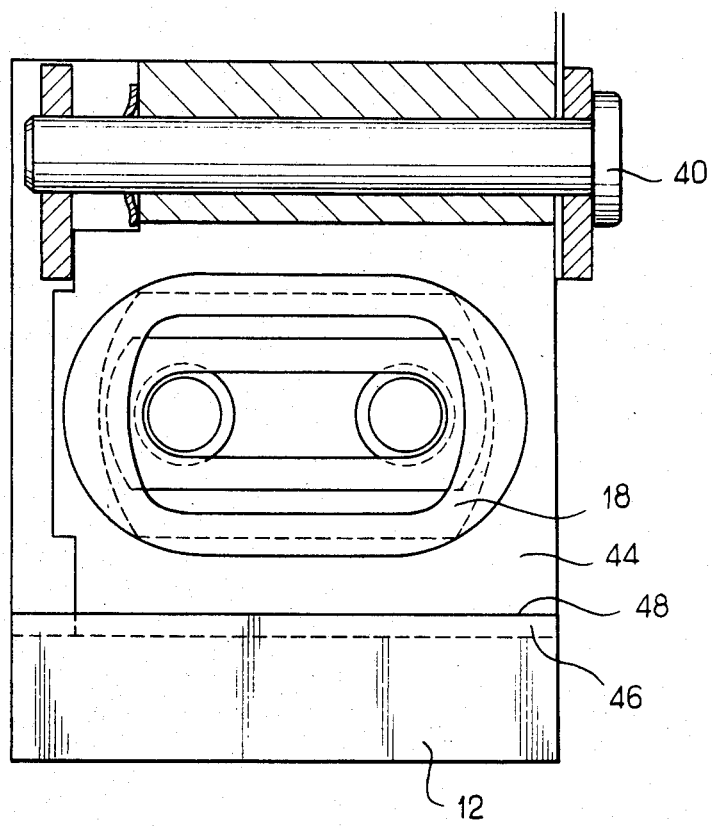
FIG_7

DEVICE FOR MOUNTING A PROTECTIVE CAP ON A SUPPORT

The present invention concerns a device for mounting a protective cap on a support, for example a braking corrector. It is desirable that a braking unit with sliding components be provided with a protective cap to prevent the entry of contaminating substances or particles. Typically this cap is made of rubber or other plastics material and is mounted on the unit by the intermediary of a circlip.

BACKGROUND OF THE INVENTION

An example of a braking corrector provided with a protective cap is given in French Pat. No. 1,483,088. The document describes a cylindrical corrector having, at one end, a base surface on which a cap is mounted. An annular mounting component is joined to the cap and the assembly is retained by a circlip which is engaged in a groove in the cylindrical wall of the corrector body. This device has the disadvantage that the base surface and the groove must be machined in the body and makes the mounting and removal of the cap a delicate operation.

SUMMARY OF THE INVENTION

The object of the present invention is therefore to propose a device for mounting a protective cap on a support, of simple construction, of low manufacturing cost and increased reliability, and particularly suitable for supports made by extrusion. To achieve this the invention provides a device for mounting a protective cap on a support, the support having a base surface intended to be at least partially protected by the cap and having a first bearing surface, the device incorporating a first rigid component joined to the periphery of the cap and a locking component situated between the first rigid component and the first bearing surface, in which the locking component is inserted by sliding laterally between the first component and the first bearing surface so as to fix the cap in position bearing against the base surface of the support.

BRIEF DESCRIPTION OF THE DRAWINGS

Other characteristics and advantages of the present invention will emerge from the following description of three embodiments, given by way of illustration, but not limiting in any way, with reference to the accompanying drawings, in which:

FIG. 5 is a view along view line 5—5 of FIG. 6 and in longitudinal section of a corrector provided with a mounting device according to a third embodiment;

FIG. 6 is a plan view of the corrector shown in FIG. 5; and

FIG. 7 is a view in partial transverse section of the corrector shown in FIG. 5.

DESCRIPTION OF THE PREFERRED EMBODIMENTS

Figure 1:
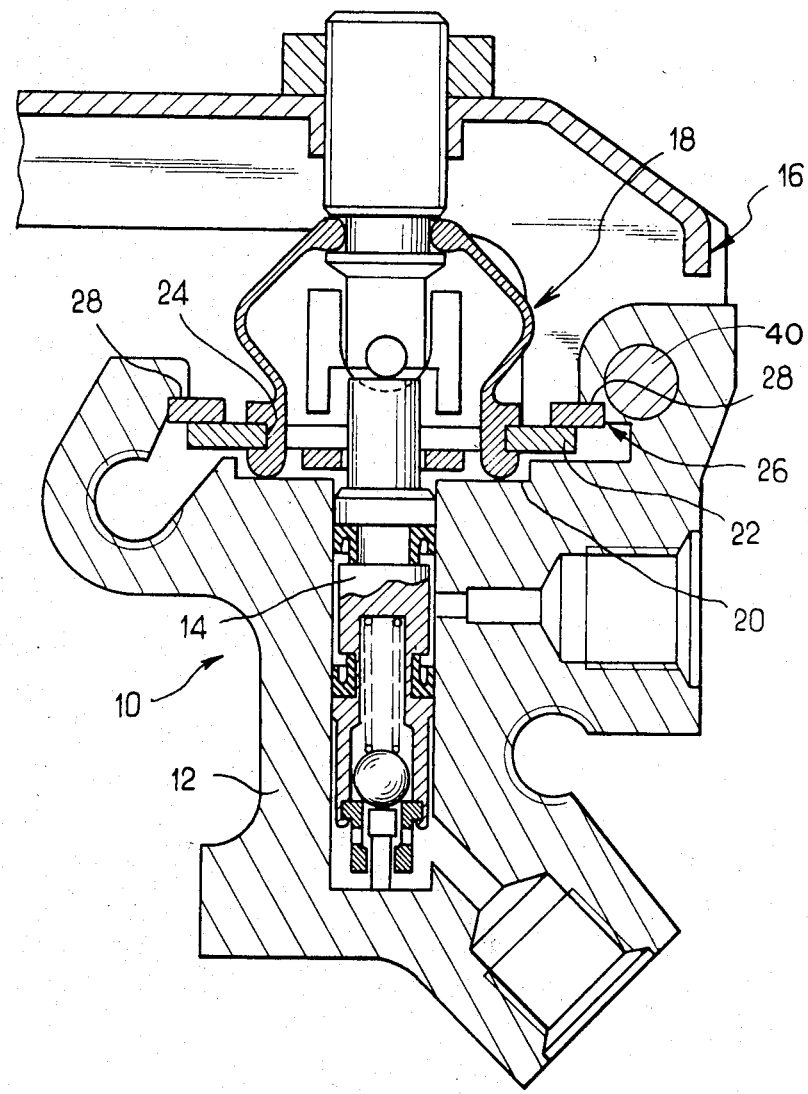
FIG. 1 is a view along view line 1—1 of FIG. 2 and in longitudinal section of a braking corrector provided with a device for mounting a cap according to a first embodiment.
Figure 2:
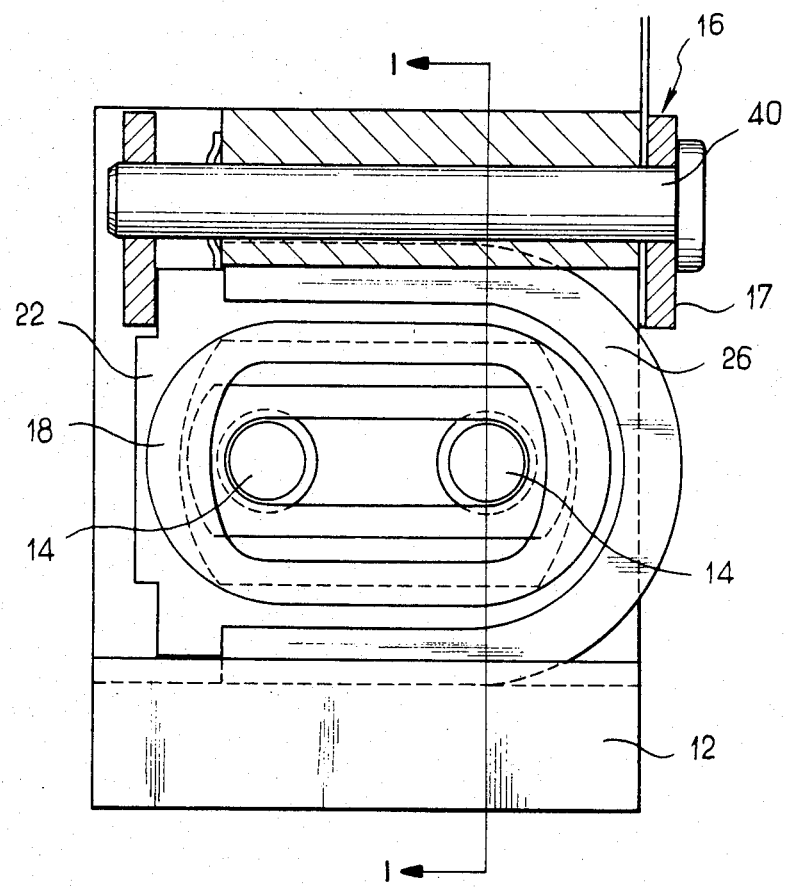
FIG. 2 is a view in partial transverse section of the corrector shown in FIG. 1.

As may be seen in FIGS. 1 and 2, a brake pressure corrector 10 incorporates a body 12, made of light alloy, for example, which, in the example shown, is made in the form of an extruded section which has been subsequently cut to length. In the embodiment shown, two pistons 14 are mounted so as to slide in the casing 12, and can be displaced as a function of the load of the vehicle under the action of a lever 16. The brake pressure corrector 10 is responsive to vehicle load; corrector 10 is mounted on the vehicle chassis and lever 16 linked to the vehicle suspension (or vice versa) so that as the vehicle load increases, arm 16 moves downwardly toward body 12 and acts upon the piston 14 to adjust the pressure communicated to the rear brakes. A protective cap 18, made of rubber or other elastomeric material, is mounted on a flat base surface 20 of the body 12. Joined to the periphery of the base of the cap 18 is an essentially annular rigid component 22. This rigid component 22 enters a peripheral groove 24 in the wall of the cap 18, by secondary moulding, for example. A locking component 26 which, in the example shown, has the shape of a U, is inserted by sliding laterally between the rigid component 22 and the two bearing surfaces 28 provided in the body 12, parallel to the base 20, and the cap is thus retained in position on the body. The locking component 26 is locked by the adjacent flange 17 (FIG. 2) of the lever 16.

Figure 3:
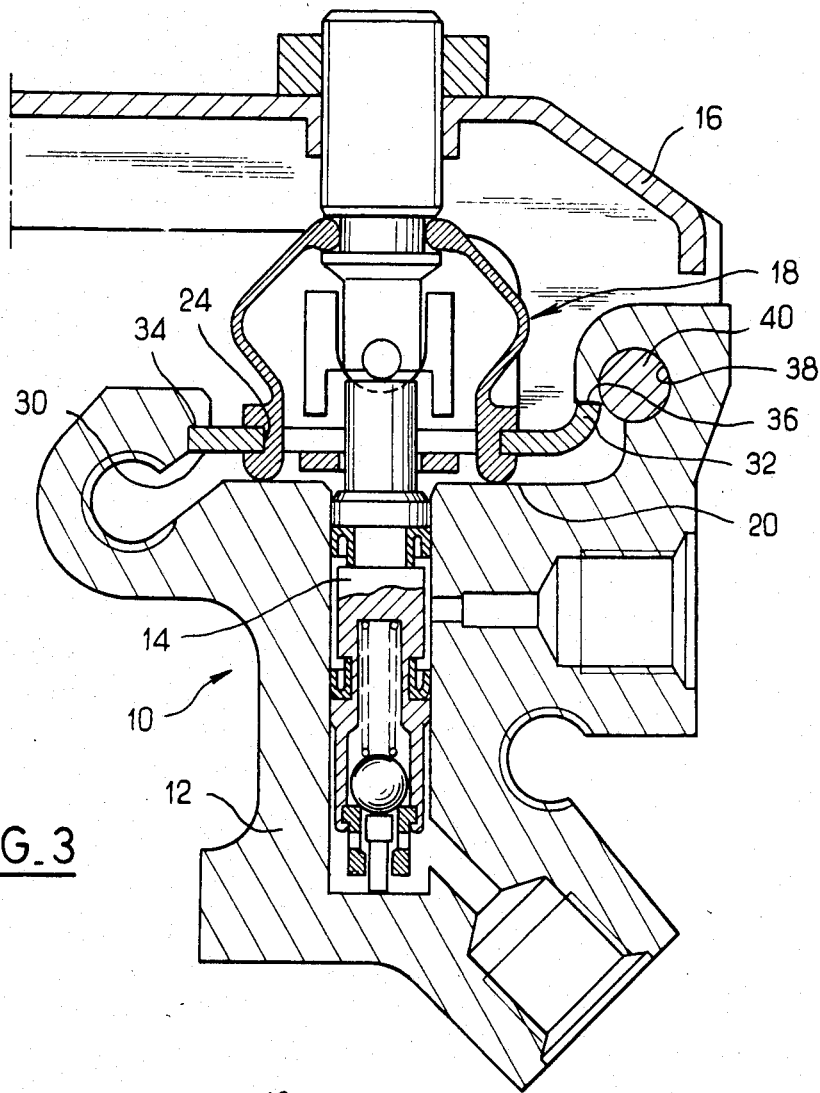
FIG. 3 is a view in longitudinal section of the corrector of FIG. 1 provided with a mounting device according to a second embodiment.
Figure 4:
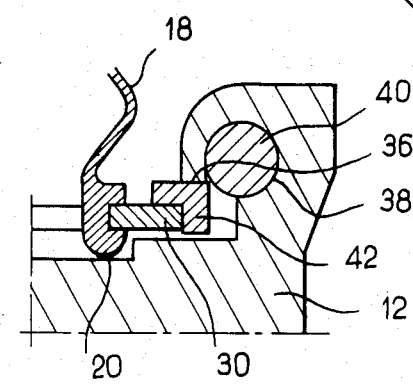
FIG. 4 is a view in partial section of a variant of the mounting device shown in FIG. 3.

FIG. 3 shows a second embodiment in which the protective cap is retained by a single rigid component 30. This component 30 is mounted at one end in a groove 24 in the wall of the cap 18 and is provided at its other end with a raised edge 32. The component 30 thus bears against two surfaces 34, 36 of the body 12, each parallel to the base 20. The mounting of the cap 18 on the body 12 is carried out as follows. The component 30 is mounted in the groove 24 of the cap 18 and the assembly is positioned around the piston 14 with the raised edge 32 introduced into the opening 38 of the body 12. The assembly is then displaced to the left looking at the figure so that the component 30 comes to bear against the surfaces 34, 36. The assembly is then retained in position by a pin 40 which is inserted by sliding into the opening 38 and which bears against the edge 32 of the component 30 and the bearing surface formed by the internal surface of the opening 38. This pin shaft 40 serves as a mounting and articulation shaft for the lever 16. A variant of the embodiment shown in FIG. 3 is illustrated in FIG. 4. In this variant, the component 30, in this case is not provided with its raised edge 32, and is retained in position by the intermediary of a key 42 which is inserted between the component 30 and the surface 36. The key 42 has a section in the shape of a L which engages the edge of the component 30. The key 42 is itself retained in position by the mounting pin 40 of the lever 16.

Another embodiment is shown in FIGS. 5, 6 and 7. A rigid component 44 is joined to the protective cap 18. The component 44 has one end 46 which cooperates with a surface 48, and an opposite end 50 which is partially rolled and which engages a second surface 52. Component 44 is retained in position by the mounting pin 40 of the lever 16 which bears against a cylindrical bearing surface 54 formed on the body 12 and the component 44. The mounting of the cap is carried out in a manner similar to that of the embodiment shown in FIG. 3. The component 44 is mounted in the groove 24 of the cap 18 and the assembly is placed in position around the piston 14. The assembly is then displaced to the left looking at the figure so that the edges 46 and 50 engage the surfaces 48 and 52. The assembly is retained in position by the mounting pin of the lever 16 which is inserted by sliding between the component 44 and the bearing surface 54 of the body 12.

We claim:

1. A locking member for mounting a protective cap on a support, the support having a first bearing surface and a base surface which is intended to be at least partially protected by the protective cap, the locking member comprising a first end joined to the periphery of the cap and the locking member extending between the first end and the first bearing surface, characterized in that the support includes a second bearing surface located adjacent a seat for receiving pin means, the locking member having a first portion engaging the first bearing surface and a second portion which extends over the seat to engage the second bearing surface, the second portion including a complementary shaped portion for the pin means, the locking member maintained in position by the pin means which is disposed between the seat and complementary shaped portion so that the first portion and second portion engage, respectively, the first and second bearing surfaces.

2. The locking member according to claim 1, characterized in that the second portion includes a reversely bent portion that engages the second bearing surface.

3. The locking member according to claim 1, characterized in that the pin means, seat, and complementary shaped portion comprise annular surfaces held in engagement by the first and second portions engaging the first and second bearing surfaces.

4. The locking member according to claim 3, characterized in that the pin means retains a lever for rotatable movement thereabout.

5. The locking member according to claim 4, characterized in that the locking member is inserted in a direction parallel to the base surface.

6. The locking member according to claim 4, characterized in that the pin means positions the complementary shaped portion so that the complementary shaped portion brings the reversely bent portion into engagement with the second bearing surface.

* * * * *